UNITED STATES PATENT OFFICE.

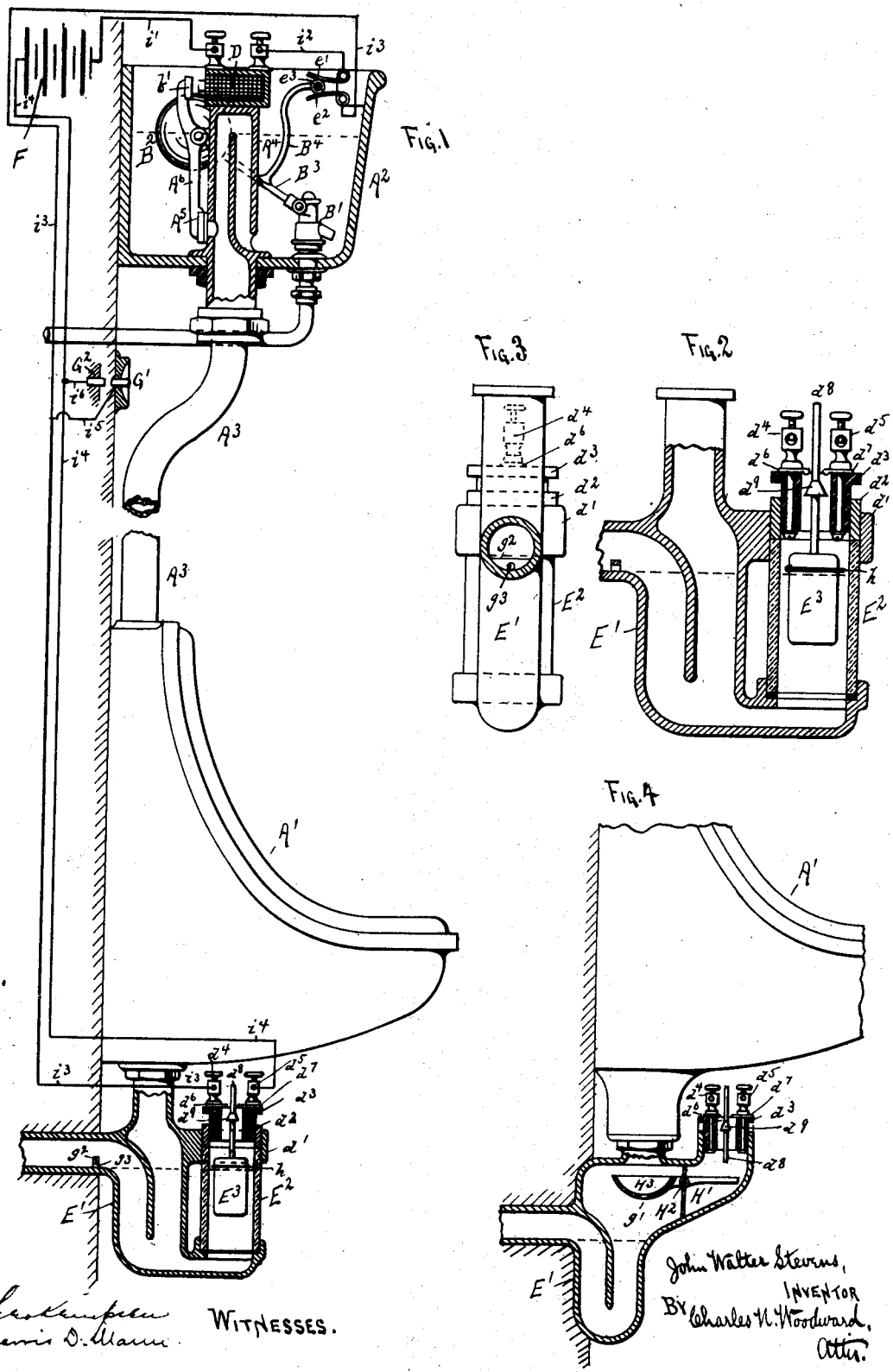

JOHN WALTER STEVENS, OF ST. PAUL, MINNESOTA.

AUTOMATIC FLUSHING-TANK.

SPECIFICATION forming part of Letters Patent No. 669,037, dated February 26, 1901.

Application filed November 3, 1898. Serial No. 695,372. (No model.)

*To all whom it may concern:*

Be it known that I, JOHN WALTER STEVENS, a citizen of the United States, residing at St. Paul, in the county of Ramsey and State of Minnesota, have made certain new and useful Improvements in Automatic Flushing-Tanks, of which the following is a specification.

This invention is applicable to any of the various forms of "flushing-tanks" now in use in connection with water-closets, urinals, slop-basins, cess-pools, and similar apparatus and is adapted to be employed in almost any locality where a flushing-tank is required.

The invention consists in the construction, combination, and arrangement of parts, as hereinafter shown and described, and specifically pointed out in the claims.

For the purpose of illustration I have shown the invention in the drawings applied to a urinal and its flushing-tank, to which it is particularly applicable.

Figure 1 represents a sectional side elevation of a flushing-tank with its siphon-valve, the automatic siphon-valve-tripping mechanism connected thereto, and the urinal-bowl and its trap. Fig. 2 is an enlarged sectional side elevation of the trap and its connections detached, and Fig. 3 is a rear elevation of the same in section on the line $x\,x$ of Fig. 2. Fig. 4 is a sectional side elevation, on the same scale as Fig. 1, of a portion of the urinal-bowl and the trap, illustrating some modifications in the construction.

$A'$ represents the bowl of a urinal, $A^2$ the flushing-tank, connected to the bowl by a pipe $A^3$, the upper end of the pipe being connected into a "siphon-valve" $A^4$ within the tank, these parts being of the usual construction, as shown. The siphon-valve $A^4$ is provided with a starting-valve $A^5$, connected to a lever $A^6$, by which the valve $A^5$ is actuated. The upper end of the lever $A^6$ is provided with an armature $b'$, adapted to be attracted by an electromagnet D, and thereby open the valve $A^5$ when the magnet is energized.

$B'$ is the supply-valve to the tank $A^2$ and adapted to be actuated by the float $B^2$ in the usual manner.

The mechanism whereby the rising water may be utilized to effect the opening and closing of an electric circuit, and thereby set the flushing apparatus into action, will preferably be by a float adapted to "make" or "break" an electric circuit by rising with the liquid, but may also be accomplished through the medium of levers or a system of levers or similar devices. In Figs. 1 and 2 a float mechanism is shown, and in Fig. 4 a lever device is shown for securing the desired results to illustrate the application of the invention. In using both devices a trap $E'$ is connected into the discharge from the bowl $A'$. In the float device a chamber $E^2$ is associated with the trap, as shown, so that the liquid will stand at the same level in both the trap and the chamber, as indicated by dotted lines in Figs. 1, 2, and 4. In Figs. 1, 2, and 3 the chamber $E^2$ is in the form of a tube, preferably of glass and supported at the top in a bracket $d'$ by a screw-sleeve $d^2$ and with a non-conductive hollow plug $d^3$, of hard rubber, vulcanite, or other suitable substance, the plug being adjustable vertically to regulate the distance which the liquid will rise in the trap before the electric contact is completed, as hereinafter shown. The plug $d^3$ is provided with two binding-posts $d^4\,d^5$, into which the electric conducting-wires will be connected in the usual manner. Each of the binding-posts $d^4\,d^5$ will be provided with a contact-plate $d^6\,d^7$ in electrical connection with the conductor-wires leading from the binding-posts. Between the contacts $d^6\,d^7$ is suspended a rod $d^8$, having a conical contact $d^9$ thereon, which is capable when the rod is elevated of engaging both the contacts $d^6\,d^7$, and thus closing an electric circuit between the wires held by the posts $d^4\,d^5$, as hereinafter explained. Within the chamber $E^2$ is a float $E^3$, which is adapted when elevated by the rising liquid to act upon the rod $d^8$ and elevate it, and thus cause the conical contact $d^9$ to engage the contacts $d^6\,d^7$, and thereby close an electric circuit, as hereinafter shown.

$e'\,e^2$ are two spring contact-points with which a contact $e^3$ engages, the contact $e^3$ being connected to the arm $B^3$ of the float $B^2$ by a rod $B^4$, so that when the float is elevated by the rising water in the tank the contact $e^3$ will engage both the contacts $e'\,e^2$ and close an electric circuit through the conductor-wires leading from them. Then when the float recedes with the falling level of the liquid the contact $e^3$ is withdrawn from between the points $e'$ $e^2$ and the circuit thereby broken.

F represents an electric battery which furnishes the power by which the apparatus is operated.

$G'$ $G^2$ represent a "push-button" mechanism connected into the electric circuits whereby the flushing apparatus may be set into action, if required, independently of the automatic mechanism, as hereinafter described.

In Fig. 4 is shown the modification in the construction whereby a lever is utilized to make or break the electric circuit, as before stated. In this arrangement $H'$ represents a lever poised at $H^2$ in the trap $E'$, with a small vessel or bowl $H^3$ upon the end of the lever directly beneath the discharge from the urinal-bowl $A'$, so that any liquid passing from the urinal-bowl will fall into the vessel $H^3$. The trap $E'$ in this modification is shown provided with the insulated plug $d^3$, the posts $d^4$ $d^5$, contacts $d^6$ $d^7$, and rod $d^8$, with its conical contact $d^9$, in the same manner as in Fig. 1, the rod $d^8$ being adapted to be elevated by the action of the lever $H'$ in the same manner as the rod is acted on by the float in the other modification. The rod $d^8$ and that part of the lever $H'$ between the fulcrum-point $H^2$ and the rod will be heavy enough to keep the vessel $H^3$ normally in its elevated position. Then when any liquid falls from the urinal-bowl $A'$ into the lever vessel $H^3$ it will move that end of the lever downward and correspondingly elevate the other end and cause the contact $d^9$ to close the electric circuit through the contacts $d^6$ $d^7$ in the same manner as in the other construction. The vessel $H^3$ will be provided with a small vent $g'$ in its center to permit the contents of the vessel to slowly escape after the vessel has performed its action, but which will be small enough to prevent the escape of the liquid as fast as it flows in from the urinal-bowl when the latter is first used. By this means no liquid will remain in the lever vessel when the lever is not in use.

In the view shown in Fig. 1, $g^2$ is a small "dam" or cross-wall in the discharge of the trap $E'$, with a small perforation $g^3$, as shown. The function of this dam is to retard the outflowing liquid somewhat, so that at the influx of liquid into the bowl the first result will be to more quickly raise the level of the liquid in the trap and its associated chamber $E^2$ than if the dam were not present, and thus more quickly release the liquid in the flushing-tank. The liquid will flow into the trap $E'$ faster than it can flow out through the small perforation $g^3$, while at the same time after the liquid ceases to flow from the flush-tank the liquid in the trap will settle to its normal position by the outflow through the perforation. The dam therefore is an important feature of my invention, as it insures a quicker response by requiring a less quantity of liquid to be introduced into the trap to insure the action of the flushing mechanism; but while this is true I do not wish to be limited to the use of the apparatus with the dam, as it will operate successfully without that feature.

The electric wiring is arranged as shown, leading from one pole of the battery F by wire $i'$ to the electromagnet D, and thence by wire $i^2$ to one of the contacts $e'$ or $e^2$, and thence by wire $i^3$ to one of the binding-posts $d^4$ or $d^5$ and its contact-plates $d^6$ or $d^7$, and thence by wire $i^4$ to the opposite pole of the battery, thus forming a circuit. From the push-button stem $G'$ a wire $i^5$ leads to the wire $i^3$, and from the push-button contact $G^2$ a wire $i^6$ leads to the wire $i^4$, so that an electric circuit may be closed through the magnet D to enable the apparatus to be operated by hand, if required.

The actuating devices will be very delicately poised, so that the introduction of a very small quantity of liquid into the bowl $A'$ will be sufficient to start the flushing apparatus into action. To insure the requisite delicate action or sensitiveness of the float $E^3$, I surround the float with a band $h$ to check the tendency of the liquid to rise by capillary attraction between the float $E^3$ and the walls of the chamber $E^2$, and thereby stand at a higher level in the chamber than in the trap. By the introduction of the band $h$ this tendency is checked and the sensitiveness of the float greatly increased. Being arranged as shown in the drawings, the circuit will be held normally open between the contacts $d^6$ $d^7$ and the magnet therefor not energized. When the urinal is used, the first small quantity of liquid will start the flushing mechanism into action. The falling of the liquid in the tank $A^2$ causes the float $B^2$ to fall with it, which carries the arm $B^4$ downward and draws the contact $e^3$ from between the spring-contacts $e'$ $e^2$ and breaks the circuit through the magnet D, and thus releases the valve $A^5$ and allows the inflowing liquid from the valve $B'$ to close the valve $A^5$ and refill the tank. As the liquid rises the float $B^2$ rises with it and forces the contact $e^3$ again between the contacts $e'$ $e^2$ and again closes the circuit between the wires $i^2$ $i^3$; but in the meantime, the liquid having run out of the bowl $A'$ and fallen again to its normal level in the trap $E'$, the float $E^3$ or lever $H'$ likewise resumes its normal position and causes the contact $d^9$ to be released from the contacts $d^6$ $d^7$ and again breaks the circuit through the wires $i^3$ $i^4$. By this simple means the flushing of the bowl $A'$ is automatically accomplished at each and every influx of liquid.

The mechanism whereby the electric curcuit is broken by the falling float $B^2$ is an important feature of my invention, as the flow of the liquid would be continuous if the circuit through the electromagnet D and the battery F were continuous. By means of the mechanism $B^4$ $e'$ $e^2$ $e^3$, however, as soon as the siphon starts to operate and the liquid begins to fall in the tank the float, falling with it, will break the circuit, as before stated, so that the apparatus is free to act automatically thereafter in just the same manner as the ordinary flushing-tank, the magnet D thereby losing its power over the lever A⁶ and permitting the inflowing liquid to close the valve A⁵ in the usual manner.

Having thus described my invention, what I claim as new is—

1. The combination of the vessel to be flushed, the flushing-pipe communicating therewith, the upper flushing-tank, the siphon-like duct connecting the flushing-tank with the said pipe, the electric circuit, the separable contacts adjacent to said flushing-tank and in the said circuit, the water-supply valve in the tank, the float in the tank adapted to open and close the said valve, the siphon-starting water-passage connecting the tank and said pipe, the valve controlling said passage, the armature connected directly to the valve, the electromagnet for said armature in the said circuit, means carried by the float for opening and closing said contact, and means at a distance from the tank for opening and closing the circuit, substantially as set forth.

2. The combination of the vessel to be flushed, the flushing-pipe, the upper flushing-tank, the electromagnetically-controlled devices for releasing the water from the tank, the electric circuit for the said devices, the escape-duct from the vessel to be flushed, the trap in the escape-duct, the electric contacts in the said circuit and adjacent to the said escape-duct, the contact-closer in the escape-duct adapted to be moved by the water therein, and the dam partially obstructing the said duct and having a reduced water-passage, whereby the liquid will be retarded when escaping through said duct, and quickly actuate said contact-closer, substantially as set forth.

3. The combination of the vessel having two passages for the reception of liquid, the flushing-pipe communicating with one of said passages, the flushing-tank, the electromagnetically-actuated device for releasing the water from the tank, the escape-duct from the vessel having a chamber for retaining a body of water, the contact-closer for the electric circuit raised and lowered by the water in the escape-duct, the dam obstructing the escape-duct and having a reduced water-passage at the level of the aforesaid body of water in the escape-duct, substantially as set forth.

In testimony whereof I have hereunto set my hand in the presence of two subscribing witnesses.

JOHN WALTER STEVENS.

In presence of—
LEWIS D. MANN,
W. P. JEWETT.